United States Patent [19]

Neff

[11] Patent Number: 4,663,795
[45] Date of Patent: May 12, 1987

[54] PIG APPARATUS

[76] Inventor: Laurence M. Neff, 9144 E. 115th St., Bixby, Okla. 74008

[21] Appl. No.: 799,438

[22] Filed: Nov. 19, 1985

[51] Int. Cl.$^4$ .............................................. B08B 9/04
[52] U.S. Cl. ............................................ 15/104.06 R
[58] Field of Search .............. 15/104.06 R, 104.06 A, 15/104.06 B, 3.5, 3.51; 134/8; 137/268; 166/153

[56] References Cited

U.S. PATENT DOCUMENTS

| | | | |
|---|---|---|---|
| 2,276,109 | 3/1942 | Smith | 15/104.06 R |
| 3,480,984 | 12/1969 | Kidd | 15/104.06 R |
| 3,496,588 | 2/1970 | Ver Nooy | 15/104.06 R |
| 4,275,475 | 6/1981 | Schwartz et al. | 15/104.06 R |
| 4,413,370 | 11/1983 | Payne et al. | 15/104.06 R |

Primary Examiner—Edward L. Roberts
Attorney, Agent, or Firm—Bill D. McCarthy

[57] ABSTRACT

An improved integrally formed pig apparatus is provided which comprises a pig body member and a plurality of scraper cup members supported on the pig body member in a spaced apart tandem relationship. Each of the scraper cup members is provided with a substantially external parabolic configuration and comprises a curvilinearly-shaped outer wall defining a partially hollow interior, the outer wall characterized as having a body portion and a distal end portion. The outer wall of the scraper cup members is provided with a varying wall thickness ranging from relatively thin at the distal end portion to relatively thick nearing the center of the body portion so that when an external force is applied to the cup members by the pipeline wall the distal end portion of the outer wall of the cup members is flexed inwardly while maintaining scraping contact with the pipeline wall along a substantial portion of the body portion of the scraper cup members.

8 Claims, 3 Drawing Figures

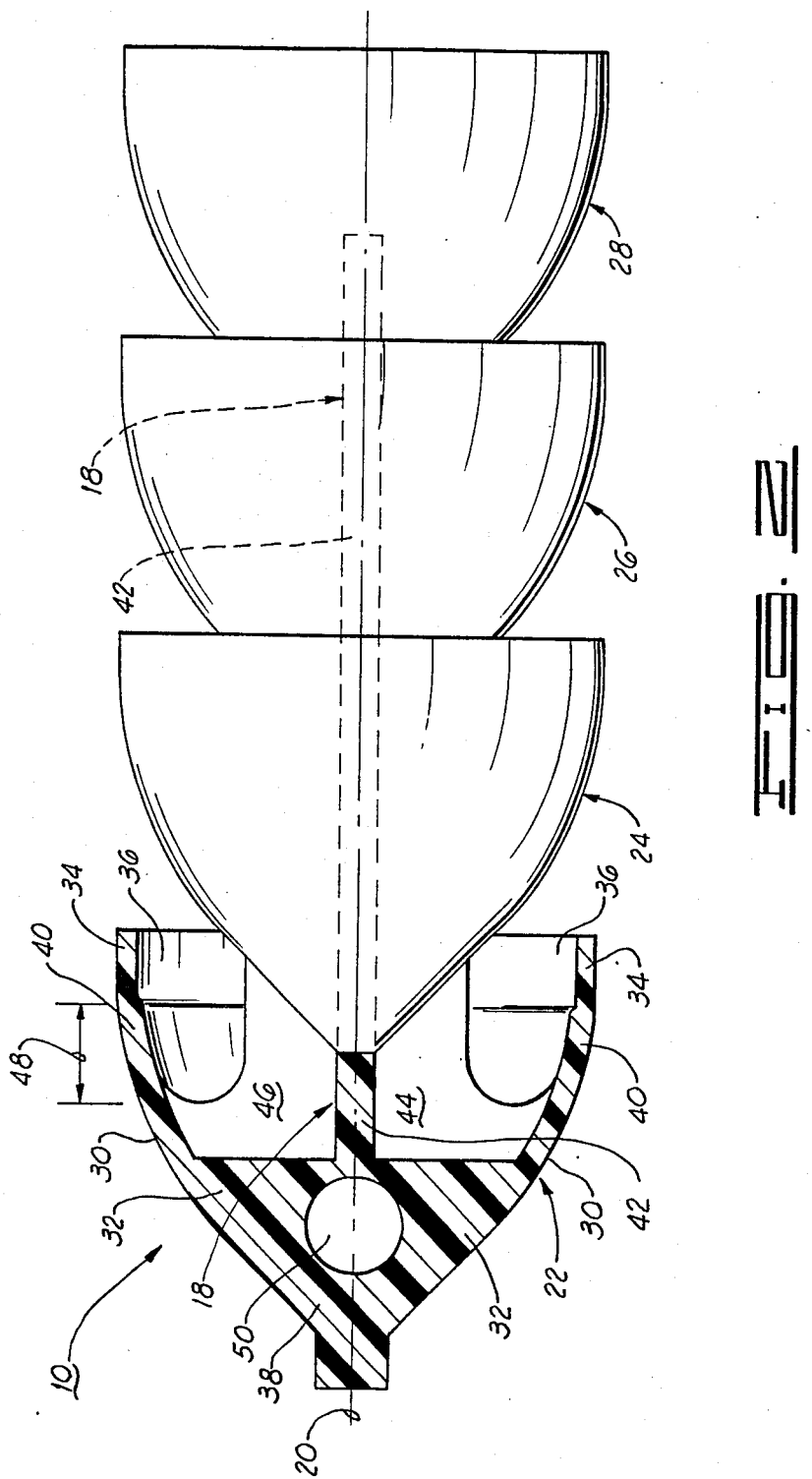

PIG APPARATUS

BACKGROUND OF THE INVENTION

1. Field of the Invention.

The present invention relates generally to pig apparatuses, and more particularly, but not by way of limitation, to an integrally formed pipeline pig apparatus having a plurality of flexible cup members, each of the cup members having a substantially external parabolic configuration.

2. Description of the Prior Art.

Pig apparatuses for passage through a pipeline have long been known and used in the petroleum industry. The pig apparatus is inserted into the pipeline and moved through the pipeline by fluids travelling through the pipeline.

Pipeline pig apparatuses are used for a number of purposes, including scraping the interior walls of a line to remove rust and encrustation, separating one fluid component from another, and when used in pipelines for conveying gas, forcing the removal of water and other liquids which have condensed in the line and settled in low areas.

Generally, pig apparatuses of the prior art include an elongated body member and two or more disc-shaped scraper cup members which are attached to the body member. Each of the scraper cup members is made of a resilient material, and completely fills the inside of the pipeline so that the pressure of the fluid being transported through the pipeline pushes the pig apparatus through the pipeline in the direction of fluid flow.

While the pig apparatuses of the prior art have generally been accepted by the industry, problems have nevertheless been encountered in the use of many of such apparatuses. For example, certain of the prior art pig apparatus do not possess the desired flexibility which results in the apparatus becoming logged in the pipeline when bends and obstacles are encountered; other of the prior art devices may become disassembled in the pipeline; and others, especially those having a tubular body portion, require an increased differential pressure to move the apparatus through the pipeline which results in excessive wear on the scraper cup members due to the increased frictional drag resistance exerted on the scraper cup members as the apparatus is moved through the pipeline.

SUMMARY OF THE INVENTION

According to the present invention an improved integrally formed pig apparatus is provided which comprises a longitudinally extending pig body member and a plurality of scraper cup members supported on the pig body member in a spaced apart tandem relationship. Each of the scraper cup members is provided with a substantially external parabolic configuration and comprises a curvilinearly-shaped outer wall defining a partially hollow interior, the outer wall characterized as having a body portion and a distal end portion. The outer wall of the scraper cup members is provided with a varying wall thickness ranging from relatively thin at the distal end portion to relatively thick nearing the center of the body portion so that when an external force is applied to the cup members by the pipeline wall the distal end portion of the outer wall of the cup members is flexed inwardly while maintaining scraping contact with the pipeline wall along a substantial portion of the body portion of the scraper cup members.

An object of the present invention is to provide an improved pig apparatus having improved structural strength and flexibility.

Another object of the present invention, while achieving the before-stated object, is to provide a pipeline pig apparatus which will maximize the wall contact of the scraper cup members of the pig apparatus with the interior walls of the pipeline while permitting the pig apparatus to be used in pipelines having varying internal diameters.

Another object of the present invention, while achieving the before-stated objects, is to provide an improved pig apparatus which can be moved through a pipeline with minimum force while achieving maximum wall contact by the scraper cup members.

Yet another object of the present invention, while achieving the before-stated objects, is to provide an improved flexible pipeline pig apparatus which does not suffer from the disadvantages of the prior art apparatuses, and which is economical to manufacture.

Other objects, advantages and features of the present invention will become clear from the following detailed description of the preferred embodiment when read in conjunction with the drawings and appended claims.

BRIEF DESCRIPTION OF THE DRAWINGS.

FIG. 2 is an elevational view, partially in cross-section, of the pipeline pig apparatus of the present invention.

DETAILED DESCRIPTION

Figure 1:
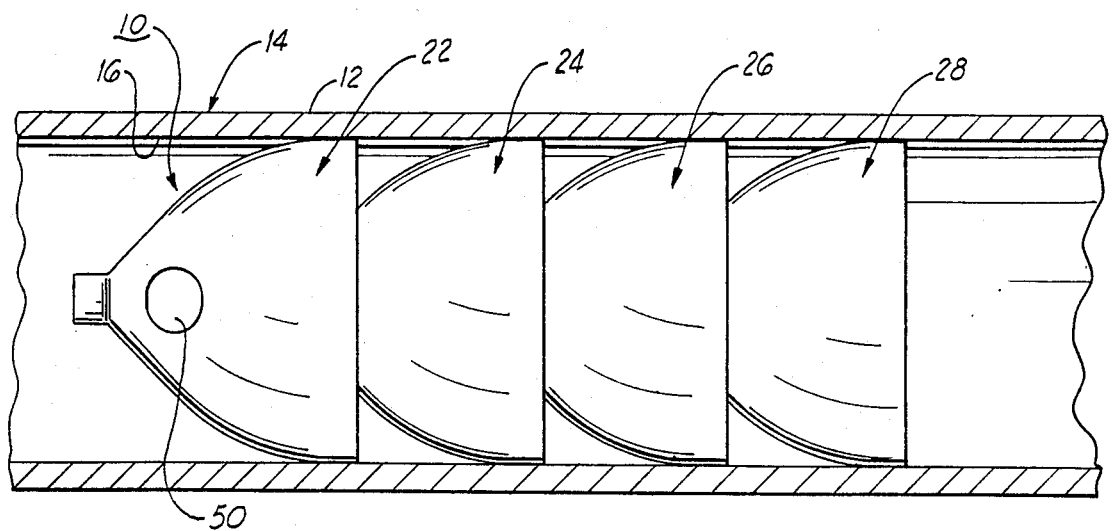
FIG. 1 is a cross-sectional view of a segment of a pipeline having a pig apparatus of the present invention positioned therein.

Referring to the drawings, and more particularly to FIG. 1, a pig apparatus 10 of the present invention is disposed within a segment 12 of a pipeline 14. The unique design of the pig apparatus 10 (an integrally formed member fabricated of a flexible, abrasive-resistant plastic material, such as polyurethane) provides maximum contact of the pig apparatus 10 with an interior wall 16 of the pipeline 14, while permitting the pig apparatus 10 to travel through the pipeline 14 with minimum force.

As more clearly shown in FIG. 2, the pig apparatus 10 comprises a longitudinally extending and flexible continuous solid cored pig body member 18 having a centrally disposed axis 20, and a plurality of flexible scraper cups members 22, 24, 26 and 28 supported by the body member 18 in a spaced apart tandem relationship. Each of the flexible scraper cup members 22, 24, 26 and 28 is substantially identical in construction. Thus, only scraper cup member 22 will be described in detail hereinafter with reference to FIGS. 2 and 3.

The scraper cup member 22, which is provided with a substantially external parabolic configuration, comprises a curvilinearly-shaped outer wall 30 having a body portion 32 and a distal end or perimeter portion 34. The outer wall 30 defines a hollow interior portion 36 within the scraper cup member 22. The outer wall 30 of the scraper cup member 22 (as well as the outer walls of the scraper cup members 24, 26 and 28) is axially symmetrical with the central axis 20 of the pig body member 18 substantially as shown in FIG. 2.

Figure 3:
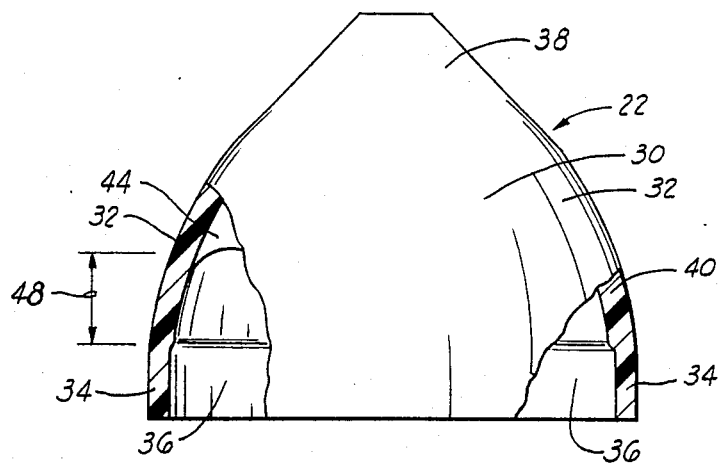
FIG. 3 is an elevational view, partially in cross-section, of a scraper cup member of the pipeline pig apparatus of the present invention.

The body portion 32 of the outer wall 30 of the scraper cup member 22 is further characterized as having an upper portion 38 and a lower portion 40. Thus, the term "parabolic configuration" as used herein to describe the shape of the scraper cup members of the pig apparatus 10, such as the scraper cup member 22, is to be understood to mean that the upper portion 38 of the outer wall 30 is substantially conically shaped, the lower portion 40 of the outer wall 30 is substantially spherically shaped, and the distal end portion 34 of the outer wall 30 is disposed such that there is a tangential parallelism to the longitudinal central axis 20 of the pig body member 18 when the scraper cup member 22 is in a noncompressed state as illustrated in FIGS. 2 and 3.

The outer wall 30 of the scraper cup member 22 has a varying wall thickness ranging from relatively thin at the distal end portion 34 to relatively thick at the lower portion 40 of the body portion 32 substantially as shown. Thus, the distal end portion 34 of the outer wall 30 of the scraper cup member 22 is provided with a flexibility greater than the body portion 32 of the outer wall 30. Therefore, when an external force is applied to the outer wall 30 of the cup member 22, such as by the interior walls of the pipeline, the distal end portion 34 of the outer wall 30 is flexed or collapsed inwardly while maintaining scraping contact with the interior wall of the pipeline along a substantial portion of the body portion 32 of the scraper cup member 28.

As shown in FIG. 2, the pig body member 18 of the pig apparatus 10 comprises a central core portion 42 and a plurality of longitudinally extending rib members (preferably four), such as rib members 44 and 46. The rib members, such as rib members 44 and 46, extend between the central core portion 42 and the body portion 32 of the outer wall 30 of the scraper cup member 22 and terminate a predetermined distance 48 from the distal end portion 34 of the outer wall 30 substantailly as shown. Thus, the rib members of the pig body member 18, such as rib members 44 and 46, stabilize and support the body portion 32 of the outer wall 30 of the scraper cup 22 while permitting limited longitudinal flexing, or bending, of the pig body member 18 in situations where the pig apparatus 10 must pass through tight pipe bends. Further, the rib members, such as rib members 44, 46, and the central core portion 42 of the body member 18 are solid cored and integrally formed with the flexible scraper cup members 22, 24, 26 and 28 of a flexible, abrasive-resistant plastic material, such as polyurethane.

In order to assist in the removal of the pig apparatus 10 from the pipeline 14, the forward-most flexible scraper cup member of the pig apparatus 10, such as scraper cup member 22, is provided with an aperture 50 extending through the upper portion 38 of the body portion 32 of the outer wall 30. The aperture 50 enables one to hook the pig apparatus 10 to remove same from the pipeline 14 in the customary manner.

Numerous advantages and features have been achieved by contructing the pig apparatus 10 as heretofore described. For example, the pig apparatus 10, an integrally formed member fabricated of a flexible, abrasive-resistant plastic material, comprises the central core portion 42, the plurality of rib members, such as rib members 44 and 46, and the scraper cup members 22, 24, 26 and 28.

As heretofore stated, each of the rib members, such as discussed for the rib members 44, 46, terminates a distance 48 from the distal end portion 34 of outer wall 30. Thus, the rib members afford longitudinal flexibility to the body member 18 while serving as substantially inflexible back-up to the flexing portions of the scraper cups. This arrangement affords material savings while stabilizing and supporting the body portion 32 of the scraper cup members. A solid cylindrically-shaped core body would serve as well to support the scraper cups, since the ribs are not flexed except by longitudinal bending of the pig apparatus 10 along its longitudinal axis 20.

The central core portion 42 and the rib members, such as rib members 44 and 46, thus provide a sufficiently rigid body to separate and support the scraper members 22, 24, 26 and 28, which are the elements of the pig apparatus 10 that provide a seal against the interior wall 16 of the pipeline 14 and perform the cleaning function. Further, the unique construction of the central core portion 42 and the rib members, such as rib members 44 and 46, of the pig body member 18 results in a continuous body structure. Thus, no internal pressure is exterted on the pig body member 18 from within the central core portion 42, as would be the case of a tubular core portion. Therefore, the frictional drag resistance exerted on the scraper cup members 22, 24, 26 and 28 is substantially reduced, resulting in longer life of the scraper cup members 22, 24, 26 and 28 while permitting the pig apparatus 10 to travel through the pipeline 14 with minimum force.

The scraper cup members 22, 24, 26 and 28 of the pig apparatus 10 are also believed unique in their flexible design and parabolic configuration. The parabolic configuration of the scraper cup members 22, 24, 26 and 28 is believed important to the feasibility and transitional qualities which direct pressure externally exerted on the scraper cup members 22, 24, 26 and 28 to a focal point in the outer wall 30 of the scraper cup members 22, 24, 26 and 28. Thus, pressure is relieved on the distal end portion 34 of the scraper cup members 22, 24, 26 and 28. Lastly, the reduced thickness of the outer wall 30 of the scraper cup members 22, 24, 26 and 28 provides the desired flexibility to the scraper cup members 22, 24, 26 and 28 which results in maximum contact with the interior wall 16 of the pipeline 14, while substantially reducing the amount of drag or friction on the scraper cup members 22, 24, 26 and 28 as the pig apparatus 10 travels through the pipeline 14.

It is clear that the present invention is well adapted to carry out the objects and to attain the ends and advantages mentioned as well as those inherent therein. While presently preferred embodiments of the invention have been described for purposes of this disclosure, numerous changes made be made which will readily suggest themselves to those skilled in the art and which are accomplished within the spirit of the invention disclosed and as defined in the appended claims.

What is claimed is:

1. An integrally formed pig apparatus for passage through a pipeline, the pig apparatus comprising:
   a longitudinally extending continuous body member having a substantially centrally disposed longitudinal axis;
   a plurality of flexible scraper cup members supported in a spaced apart tandem relationship along the continuous body member, each of the scraper cup members having a substantially external parabolic configuration and comprising a curvilinearly-shaped outer wall having a body portion, a distal end portion and defining a hollow interior portion, the distal end portion of the scraper cup member having a flexibility greater than the remainder of the outer wall of the cup member such that when an external force is applied to the cup member by the pipeline wall the distal end portion of the outer wall is flexed inwardly while maintaining scraping contact with the pipeline wall along a substantial portion of the body portion of the scraper cup member; and wherein the continuous body member comprises a central core portion and a plurality of longitudinally extending rib members disposed between the core portion of the body member and the body portion of each cup member a distance from the distal end portion thereof.

2. The pig apparatus of claim 1 wherein the central core portion and the longitudinally extending rib members are solid cored.

3. The pig apparatus of claim 2 wherein the central core portion, the longitudinally extending rib members and the scraper cup members are fabricated of a flexible, abrasive-resistant plastic material.

4. The pig apparatus of claim 3 wherein the flexible, abrasive-resistant plastic material is polyurethane.

5. A pipeline pig apparatus, comprising:
a longitudinally extending continuous pig body member;
a plurality of flexible scraper cup members supported by the pig body member in spaced apart tandem relationship, each scraper cup member having a partially hollow interior and substantially curvilinearly-shaped outer wall which is axially symmetrical and having a pipe wall engaging cup distal portion, the cup wall having a varying wall thickness ranging from relatively thin at the cup distal portion to relatively thick nearing the center thereof so that the cup distal portion is collapsible inwardly when external force is against the cup distal portion such as by the compressing force of the pipeline wall; and wherein the continuous body member comprises:
a central core portion; and
a plurality of longitudinally extending rib members disposed between the core portion of the body member and the body portion of each cup member a distance from the distal end portion thereof.

6. The pipeline pig apparatus of claim 5 wherein the body member is solid cored, and wherein the body member and cup members are integrally formed of a flexible plastic material.

7. The pipeline pig apparatus of claim 6 wherein the greater portion of the outer wall of each of the cup members is parabolically curved.

8. The pipeline pig apparatus of claim 7 wherein the cup distal portion is shaped such there is a tangential parallelism to the longitudinal axis of the body member.

* * * * *